(12) United States Patent
Manning

(10) Patent No.: US 12,017,787 B2
(45) Date of Patent: Jun. 25, 2024

(54) AIRCRAFT PROPELLER BLADE RADIATOR

(71) Applicant: Experimental Vehicle Engineering Ltd., Parker, CO (US)

(72) Inventor: Kerry Gregg Manning, Parker, CO (US)

(73) Assignee: Experimental Vehicle Engineering Ltd., Parker, CO (US)

( * ) Notice: Subject to any disclaimer, the term of this patent is extended or adjusted under 35 U.S.C. 154(b) by 10 days.

(21) Appl. No.: 17/929,823

(22) Filed: Sep. 6, 2022

(65) Prior Publication Data

US 2023/0074603 A1 Mar. 9, 2023

Related U.S. Application Data

(60) Provisional application No. 63/241,408, filed on Sep. 7, 2021.

(51) Int. Cl.
*B64D 33/10* (2006.01)
*B64C 11/24* (2006.01)
*B64C 11/30* (2006.01)

(52) U.S. Cl.
CPC .............. *B64D 33/10* (2013.01); *B64C 11/24* (2013.01); *B64C 11/303* (2013.01)

(58) Field of Classification Search
CPC .......................... B64C 11/16–28; B64C 33/10
See application file for complete search history.

(56) References Cited

U.S. PATENT DOCUMENTS

| | | | |
|---|---|---|---|
| 2,455,313 A | 11/1948 | Osofsky | |
| 2,641,439 A * | 6/1953 | Williams | F01D 5/187 |
| | | | 205/228 |
| 2,891,627 A | 6/1959 | Ditmer et al. | |
| 2,986,220 A | 5/1961 | Bodem et al. | |
| 4,738,594 A * | 4/1988 | Sato | F04D 29/324 |
| | | | 416/213 A |
| 4,750,862 A | 6/1988 | Barnes et al. | |
| 8,721,285 B2 * | 5/2014 | Liang | F01D 5/188 |
| | | | 415/115 |
| 9,995,147 B2 | 6/2018 | Mongillo et al. | |
| 10,501,169 B2 | 12/2019 | Waddleton | |
| 10,696,412 B2 | 6/2020 | Mackin | |

(Continued)

FOREIGN PATENT DOCUMENTS

| | | | | |
|---|---|---|---|---|
| GB | 583545 A | 12/1946 | | |
| GB | 2518715 A | 4/2015 | | |
| WO | WO-2012066262 A2 * | 5/2012 | ............. | B64C 11/24 |

OTHER PUBLICATIONS

"Experimental Aircraft Info", retrieved online on Sep. 9, 2022 from url https://www.experimentalaircraft.info/articles/engine-lubrication.php; 4 pages.

*Primary Examiner* — Christopher R Legendre
(74) *Attorney, Agent, or Firm* — Bejin Bieneman PLC

(57) ABSTRACT

An aircraft blade assembly, including: a blade extending from a blade root to an opposite tip; and a heat exchanger disposed on at least a portion of a leading edge of the blade, the heat exchanger including: a first arcuate panel shaped to conform to the leading edge of the blade; and a second arcuate panel mated with the first arcuate panel; wherein at least one of the first and second arcuate panels includes a channel formed thereon to form a fluid passage between the first and second arcuate panels.

18 Claims, 11 Drawing Sheets

(56) References Cited

U.S. PATENT DOCUMENTS

2011/0194941 A1* 8/2011 Parkin ..................... B29C 70/48
  416/224
2015/0093272 A1    4/2015 Körner et al.
2023/0074603 A1* 3/2023 Manning ................ B64D 33/10

* cited by examiner

E-E

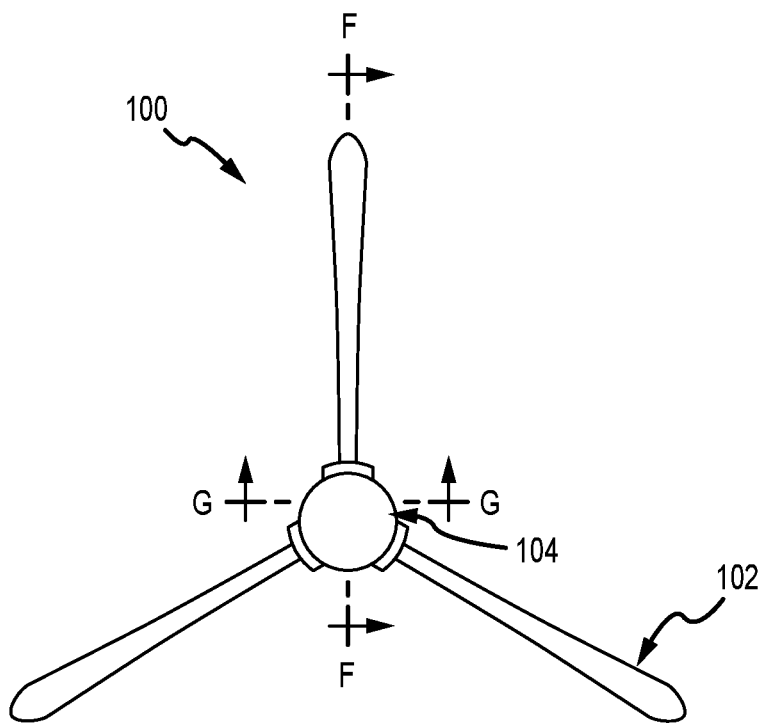
FIG.9A
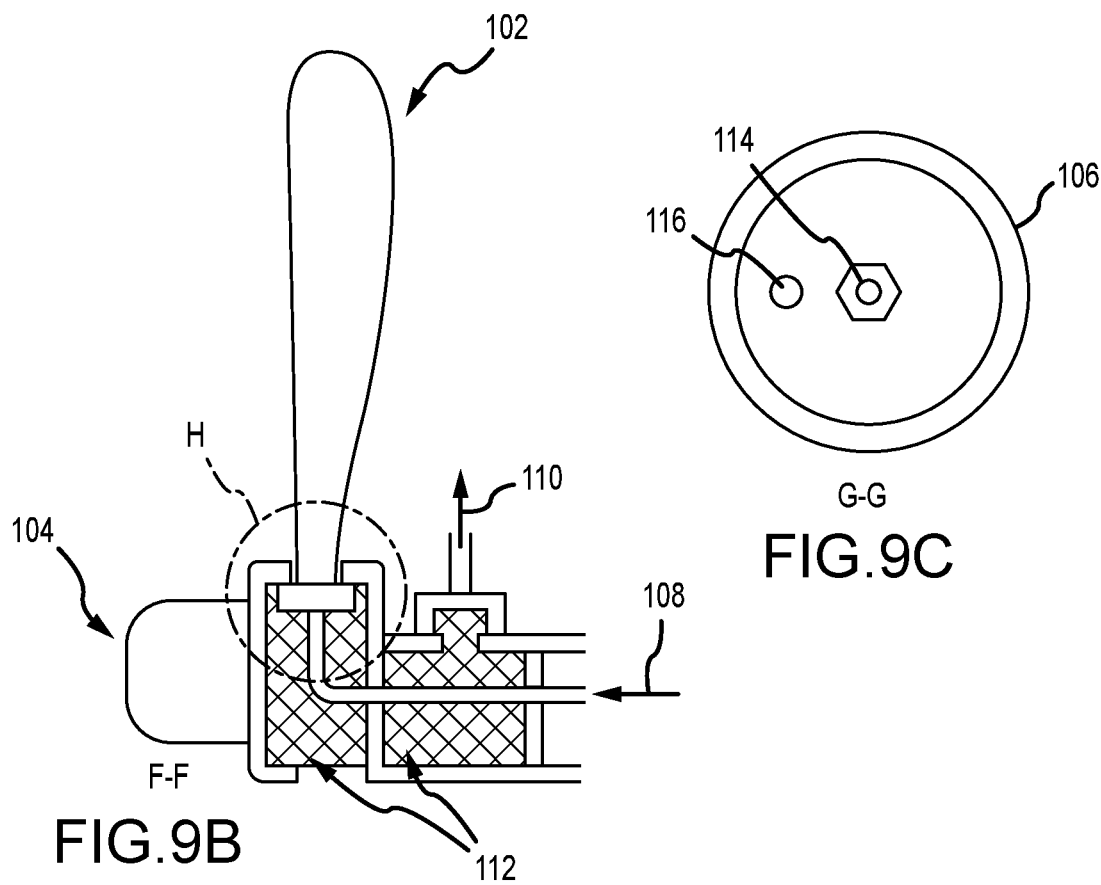
FIG.9B
FIG.9C

AIRCRAFT PROPELLER BLADE RADIATOR

CROSS-REFERENCE TO RELATED APPLICATION

This application claims the benefit of and priority to U.S. Provisional Patent Application No. 63/241,408, filed Sep. 7, 2021, the disclosure of which is incorporated herein by reference in its entirety.

TECHNICAL FIELD

This patent application is directed to aircraft propeller blades, and more specifically, to an aircraft propeller configuration which permits the propeller to function as a radiator for coolant.

BACKGROUND

Conventional propeller aircraft are powered by an internal combustion engine (ICE). Aircraft powered with electric motors have become more common with the advent of high-performance batteries. Whether the aircraft is powered by an ICE or a motor, the system needs a way to cool the heat generating components of each system. For example, the ICE powered aircraft need to cool the engine itself and an electric aircraft needs to cool the motor and batteries, albeit to a lesser extent compared to an ICE.

In both cases, liquid cooling is a known technology for cooling these components. However, liquid cooling involves added weight, additional components, and increased drag due to increased frontal area associated with e.g., radiators. Accordingly, there remains a need for improved aircraft cooling technology to reduce weight, complexity, and drag.

BRIEF DESCRIPTION OF THE DRAWINGS

The aircraft propeller blade radiator system described herein may be better understood by referring to the following Detailed Description in conjunction with the accompanying drawings, in which like reference numerals indicate identical or functionally similar elements:

FIG. 9A is a front view of a propeller and hub assembly according to some embodiments of the disclosed technology;

FIG. 9B is a cross-section view of the propeller and hub assembly shown in FIG. 9A taken about line F-F;

FIG. 9C is a cross-section view of the propeller and hub assembly shown in FIG. 9A taken about line G-G.

Figure 1:
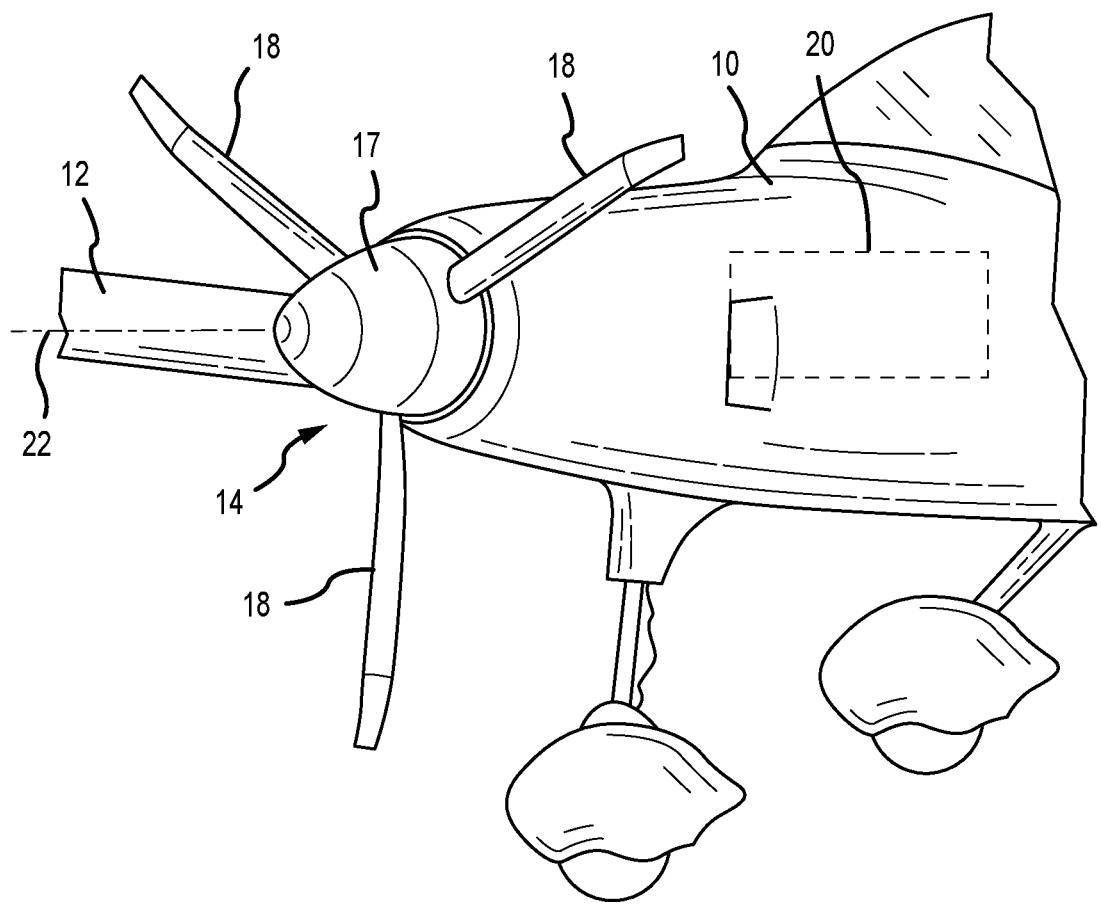
FIG. 1 is a perspective view of a front end of a propeller-driven aircraft according to some embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

SUMMARY

In one embodiment, the disclosed technology provides an aircraft propeller blade radiator comprising: a hub communicating with a source of heat for the flow of coolant from the source of heat to the hub and from the hub to the source of heat; and a propeller blade mounted to the hub for rotation with the hub, the propeller blade including a coolant passage communicating with the hub for receiving hot coolant, exchanging heat from the coolant between the propeller blade and the atmosphere surrounding the blade to create reduced temperature coolant, and returning the reduced temperature coolant to the hub.

In some embodiments, the source of heat can be an engine, an electric motor, gear box, batteries, inverter, and/or fuel cell (e.g., hydrogen). In some embodiments, the coolant is engine oil. In some embodiments, the coolant passage is a plurality of radially extending micro passages in the propeller blade. In some embodiments, the propeller blade is constructed of aluminum with the coolant passage machined or 3D printed into the propeller blade. In some embodiments, the propeller blade is constructed of aluminum with the coolant passages machined into the propeller blade before the forging process so that the passages are additionally formed during the forging process to allow for more complicated shapes that increase flow and heat rejection capabilities. In some embodiments, the propeller blade includes a root mounted to the hub and a tip at an opposite end, a span of the propeller blade being a distance between the root and tip, and the coolant passage extends from the root toward the tip no more than one-third the span of the propeller blade. In some embodiments, the coolant flows through the coolant passage under the influence of a pump. In some embodiments, the pump is a component of a mechanical pitch governor for controlling a pitch of the propeller blade.

In another embodiment the disclosed technology provides a method of transferring heat from an aircraft source of heat to an aircraft propeller comprising the steps of: heating coolant with heat from the source of heat to generate hot coolant; flowing the hot coolant through a coolant passage in the propeller; exchanging heat from the hot coolant to the propeller and from the propeller to the atmosphere around the propeller to transform the hot coolant into reduced temperature coolant; and returning the reduced temperature coolant to the source of heat.

In some aspects, the techniques described herein relate to an aircraft blade assembly, including: a blade extending from a blade root to an opposite tip; and a heat exchanger disposed on at least a portion of a leading edge of the blade, the heat exchanger including: a first arcuate panel shaped to conform to the leading edge of the blade; and a second arcuate panel mated with the first arcuate panel; wherein at least one of the first and second arcuate panels includes a channel formed thereon to form a fluid passage between the first and second arcuate panels.

In some aspects, the techniques described herein relate to an aircraft blade assembly, wherein the channel is a serpentine channel and the fluid passage is a serpentine fluid passage. In some aspects, the techniques described herein relate to an aircraft blade assembly, further including inlet and outlet connections in fluid communication with the fluid passage and extending radially through the blade root, wherein at least one of the inlet and outlet connections is concentric with a pitch rotation axis of the blade and contains one or more swivel or rotary unions. In some aspects, the techniques described herein relate to an aircraft blade assembly, wherein the blade includes a recessed region and the heat exchanger is positioned in the recess. In some aspects, the techniques described herein relate to an aircraft blade assembly, wherein the heat exchanger is attached to the recessed region with adhesive. In some aspects, the techniques described herein relate to an aircraft blade assembly, wherein the first and second arcuate panels include sheet metal. In some aspects, the techniques described herein relate to an aircraft blade assembly, wherein the first and second arcuate panels are welded together to form the fluid passage. In some aspects, the techniques described herein relate to an aircraft blade assembly, wherein the heat exchanger further includes thermal breaks formed between portions of the fluid passage. In some aspects, the techniques described herein relate to an aircraft blade assembly, wherein the heat exchanger covers at least a portion of both a front and a back side of the blade adjacent the leading edge.

In some aspects, the techniques described herein relate to an aircraft blade assembly, including: a hub including a fluid return cavity; a blade extending from a blade root to an opposite tip, wherein the blade root is coupled to the hub; and a heat exchanger disposed on at least a portion of a leading edge of the blade, the heat exchanger including: a first arcuate panel shaped to conform to the leading edge of the blade; a second arcuate panel mated with the first arcuate panel, wherein at least one of the first and second arcuate panels includes a channel formed thereon to form a fluid passage between the first and second arcuate panels; an first connection in fluid communication with the fluid passage; and an second connection in fluid communication with the fluid passage and the fluid return cavity.

In some aspects, the techniques described herein relate to an aircraft blade assembly, wherein the first and second connections extend radially through the blade root. In some aspects, the techniques described herein relate to an aircraft blade assembly, wherein the blade includes a recessed region and the heat exchanger is positioned in the recess. In some aspects, the techniques described herein relate to an aircraft blade assembly, wherein the heat exchanger is attached to the recessed region with adhesive. In some aspects, the techniques described herein relate to an aircraft blade assembly, wherein the first and second arcuate panels include sheet metal. In some aspects, the techniques described herein relate to an aircraft blade assembly, wherein the first and second arcuate panels are welded together to form the fluid passage. In some aspects, the techniques described herein relate to an aircraft blade assembly, wherein the heat exchanger further includes thermal breaks formed between portions of the fluid passage. In some aspects, the techniques described herein relate to an aircraft blade assembly, wherein the heat exchanger covers at least a portion of both a front and a back side of the blade adjacent the leading edge. In some aspects, the techniques described herein relate to an aircraft blade assembly, wherein the hub and fluid cavity are components of a hydro-mechanical pitch governor for controlling a pitch of the blade.

In some aspects, the techniques described herein relate to an aircraft blade assembly, including: a blade extending from a blade root to an opposite tip; and a heat exchanger disposed on at least a portion of a leading edge of the blade, the heat exchanger including: a channel formed into the surface of the blade; and an arcuate panel shaped to conform to the leading edge of the blade and cover the channel to form a fluid passage between the blade and the panel. In some aspects, the techniques described herein relate to an aircraft blade assembly, wherein the panel further includes thermal breaks formed between portions of the fluid passage.

DETAILED DESCRIPTION

Various examples of the systems and devices introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

FIG. 1 illustrates an aircraft 10 which includes fixed wings 12 and a propeller assembly 14 on a nose of the aircraft 10. The disclosed technology may be applied to other types of aircraft, including those having multiple propeller assemblies mounted to the wings. Furthermore, the blades incorporating heat exchangers as disclosed herein can be applied to ducted fan blades as well as open rotor (e.g., propeller) blades. The illustrated propeller assembly 14 includes a hub 16 (FIG. 3) under a nose cone 17 and three propeller blades 18 extending radially from the hub 16. The hub 16 rotates under the influence of a prime mover 20 which is an electric motor in the illustrated embodiment but may be any other suitable prime mover in other embodiments, such as batteries, environmental control, fuel cells, engines, etc. The hub 16 rotates about a longitudinal axis 22 and the propeller blades 18 rotate with the hub 16 to create thrust to propel the aircraft 10 parallel to the longitudinal axis 22. The illustrated prime mover 20 is a source of heat and is cooled by a coolant such as engine oil. In other embodiments another source of heat other than the prime mover may be cooled by the coolant referred to below and the coolant may be something other than engine oil.

Figure 2:
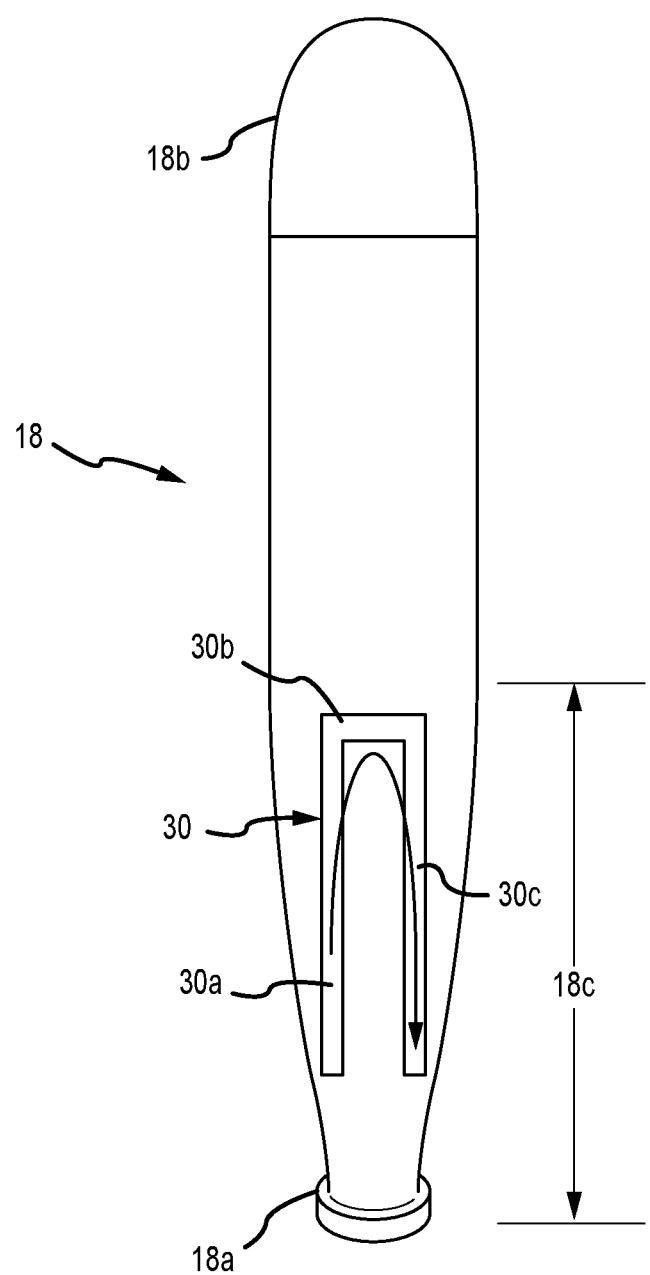
FIG. 2 is a front view of a propeller assembly of the aircraft, with a schematic illustration of coolant flow passages according to some embodiments of the disclosed technology.

Turning now to FIG. 2, each propeller blade 18 includes a root 18a at a proximal end adjacent the hub 16 and a tip 18b at a distal free end. The propeller blade 18 tapers down in thickness between the root 18a and the tip 18b, with the thickest part of the propeller blade 18c being the first third (⅓) of the propeller blade 18 extending radially from the root 18a. Each propeller blade 18 includes a coolant passage 30 which is illustrated schematically. The propeller blade 18 can be made of aluminum or an aluminum/CFRP hybrid and the coolant passage 30 can be machined into the propeller blade 18 either before, during or after a multi-step forging process.

In alternative embodiments, the propeller blade is produced using additive manufacturing technologies (e.g., 3D printed) with the coolant passage 30 formed in place. A radially outward leg 30a of the illustrated coolant passage 30 extends radially from the root 18a toward the tip 18b about one-third (⅓) of the span of the propeller blade 18, the span of the propeller blade 18 being the distance from the root 18a to the tip 18b. A return portion 30b of the coolant passage 30 turns back toward the root 18a from the radially outward end of the outward leg 30a. A radially inward leg 30c of the illustrated coolant passage 30 extends radially from the return portion 30b to the root 18a. The radially outward leg 30a may be referred to as the hot leg and the radially inward leg 30c may be referred to as the return leg or cool leg. The coolant passage 30 in each propeller blade 18 may be a single macro passage (i.e., having a relatively large diameter) or a plurality of micro passages (i.e., having relatively small diameters) to achieve a desired flow rate and heat transfer characteristics. The passages may be thermally separated by internal air gaps (or thermally resistive materials) to serve as thermal breaks that serve to minimize the outlet temperature of the coolant. The illustrated coolant passage 30 has a constant diameter through the outward leg 30a, return portion 30b, and inward leg 30c. In alternative embodiments, the coolant passage 30 has a tapered or variable diameter over its length.

Figure 3:
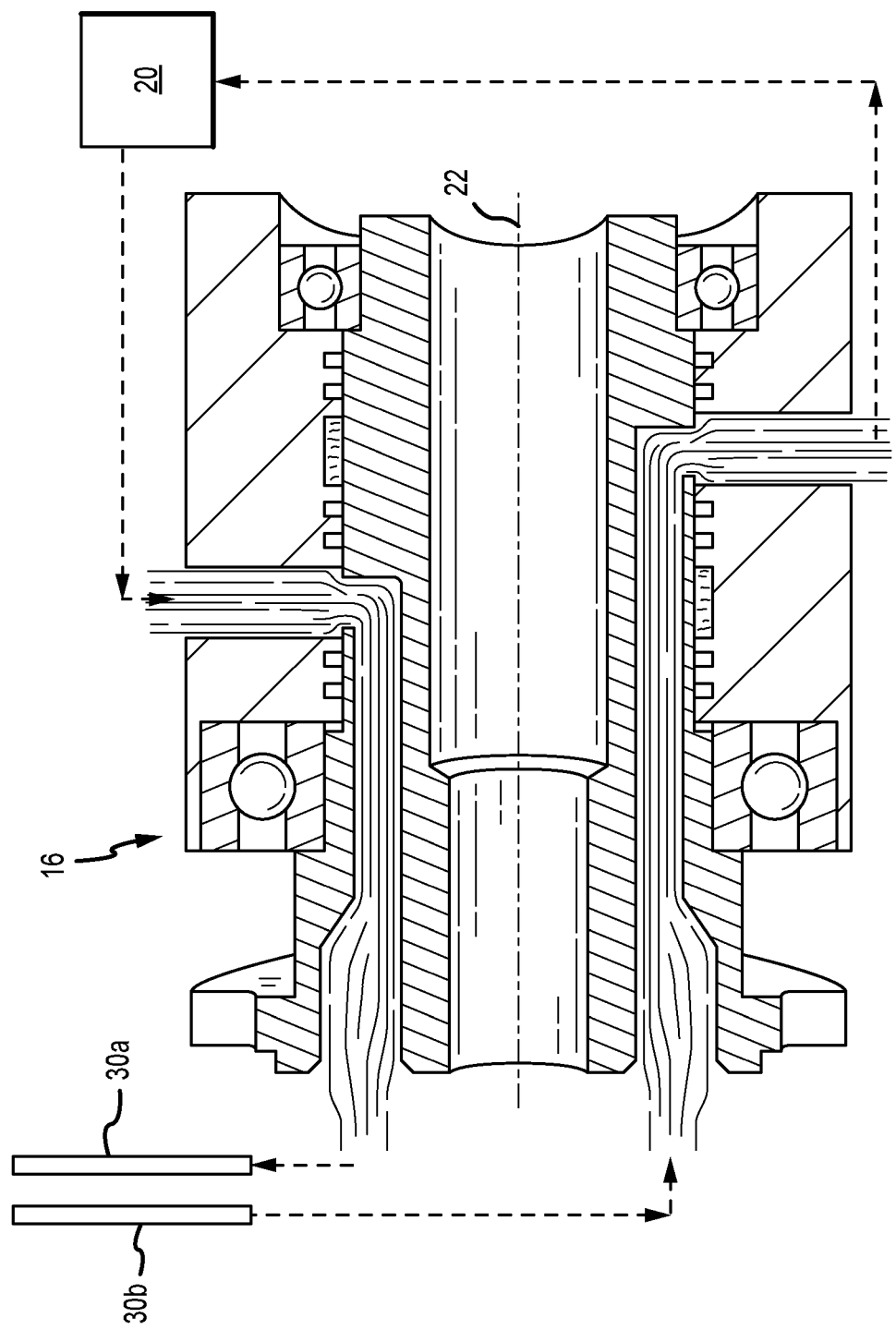
FIG. 3 is a cross-section view of a hub for the propeller assembly according to some embodiments of the disclosed technology.

As illustrated schematically in FIG. 3, the hub 16 communicates between the prime mover 20 and the coolant passage 30 to route coolant from the prime mover 20 to the outward leg 30a of the coolant passage 30 and to route the coolant from the inward leg 30c of the coolant passage 30 back to the prime mover 20. More specifically, the hub 16 receives the hot coolant from the prime mover 20 in the radial direction, flows the hot coolant longitudinally (parallel to the longitudinal axis 22) into the outward leg 30a. The hub 16 receives the reduced temperature coolant from the inward leg 30c longitudinally and returns the reduced temperature coolant radially back to the prime mover 20. In the illustrated embodiment the coolant is engine oil used to cool the prime mover 20 but in other embodiments it may be another type of coolant. The coolant exchanges heat with the propeller blade 18 as the coolant flows through the coolant passage 30. More specifically, the coolant is relatively hot as it flows into the outward leg 30a and is relatively cool as it flows out of the inward leg 30c. The hot coolant flowing into the outward leg 30a is referred to hot coolant and the cooler coolant flowing out of the inward leg 30c is referred to as reduced temperature coolant. The propeller blade 18 therefore acts as a radiator or heat exchanger to shed heat from the prime mover 20 to the air through which the aircraft 10 is moving. Additionally, the heat exchange phenomenon increases the temperature of the propeller blades 18 to reduce the likelihood or severity of icing and potentially eliminate the need for a separate anti-ice system. In the case of long lower powered conditions, such as loiter and decent, a supplementary heat source could be utilized to maintain the coolant temperature above the minimum values needed for the anti-ice function.

Figure 4:
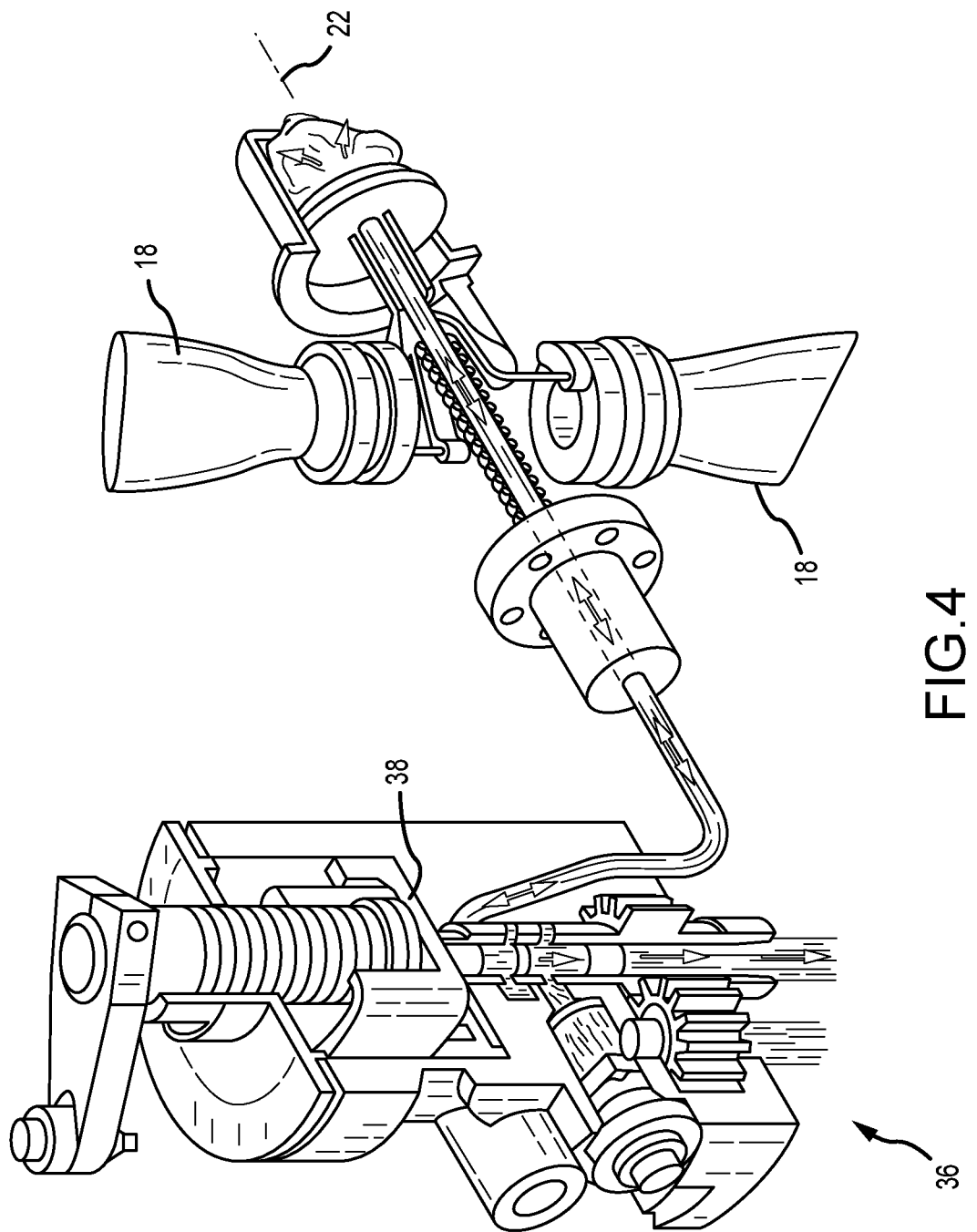
FIG. 4 is a pitch governor which provides coolant to the coolant flow passages according to some embodiments of the disclosed technology.

FIG. 4 illustrates a mechanical pitch governor 36 which uses coolant to automatically adjust the pitch of the propeller blades 18 in response to certain physical inputs, as is known in the industry. The mechanical pitch governor 36 includes a pump 38 to pressurize the coolant to adjust the propeller blade pitch. In the disclosed technology, the pump 38 of the mechanical pitch governor 36 also forces the coolant through the coolant passage 30 such that the coolant moves through the coolant passage 30 under the influence of the mechanical pitch governor 36. As such, the mechanical pitch governor 36 is used to perform two functions: control the pitch of the propeller blades 18 and as a motive force for flow of the coolant through the coolant passage 30. In some embodiments, the pump provides variable speed/flow that is regulated to maintain the temperature while there will be a valve on the outflow that will regulate the system pressure and that will provide the pitch control. The pump provides variable flow rates for the coolant through the coolant passage 30 and can be set up to provide higher flow rates when desirable (e.g., during takeoff and at high altitudes) or lower flow rates when called for (e.g., level cruising flight). In other embodiments, the mechanical pitch governor 36 and coolant system includes three fluid lines, with two of the fluid lines being larger flow lines for cooling and the third fluid line being a channel (potentially smaller) that is only for providing blade pitch control. Some propellers are single piece "fixed pitch" units, some are multiple piece "ground adjustable" propellers, while others are "variable pitch" which are commonly referred to "constant speed propellers" as they are used with a mechanical or electrical governor. The disclosed technology can be applied to any blade whether it be fixed pitch or adjustable pitch.

Figures 5A, 5B:
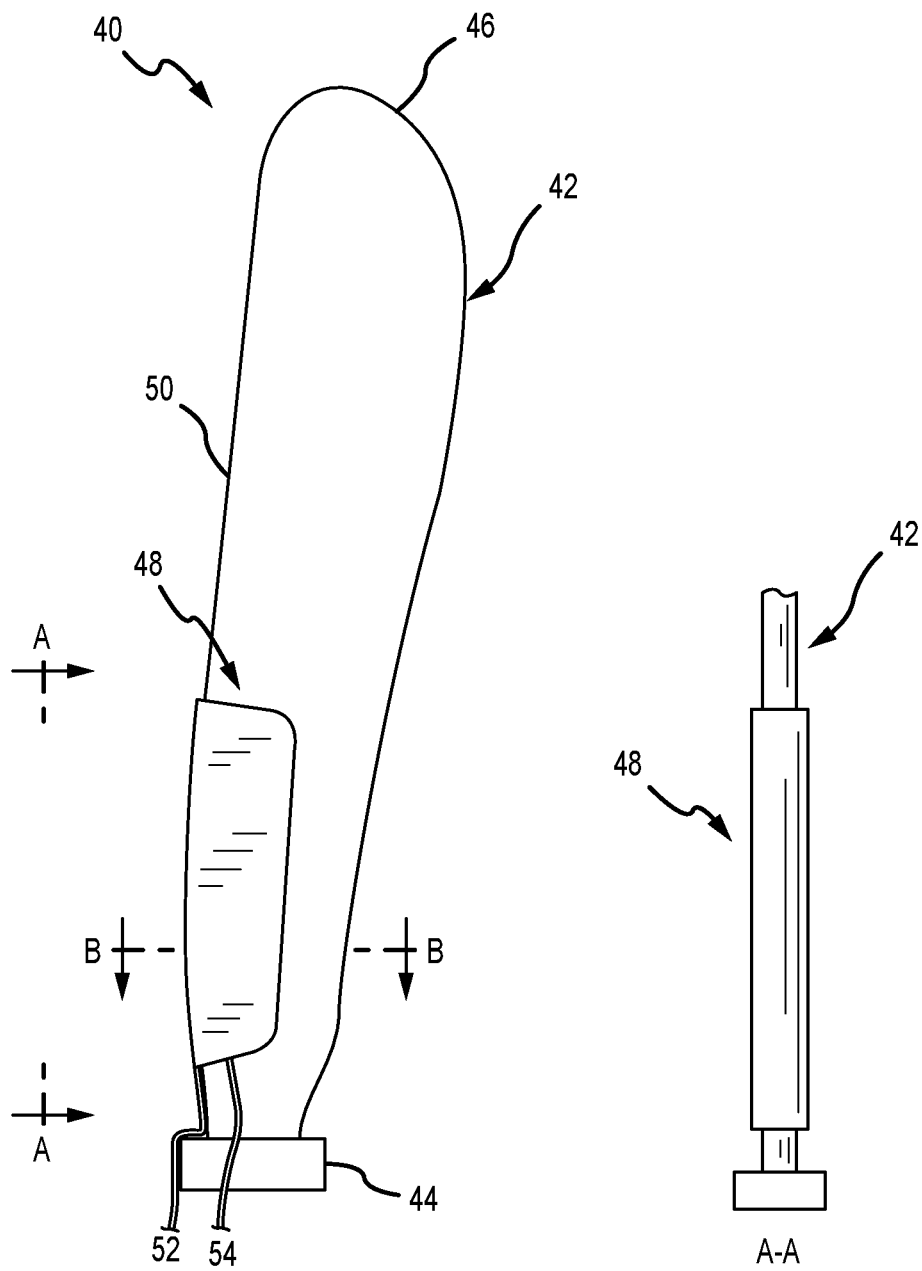
FIG. 5A is a front view of a propeller assembly having a leading edge radiator according to some embodiments of the disclosed technology.
FIG. 5B is a partial side view of the propeller assembly shown in FIG. 5A taken about line A-A.

FIGS. 5A and 5B illustrate an aircraft propeller blade assembly 40 according to some embodiments of the disclosed technology. The blade assembly 40 can include a propeller blade 42 extending from a blade root 44 to an opposite tip 46. A radiator or heat exchanger 48 is disposed on the surface of at least a portion of a leading edge 50 of the blade 42. The radiator 48 can include an inlet connection 52 and an outlet connection 54. In some embodiments, the connections can comprise e.g., flexible hoses.

Figure 6A:
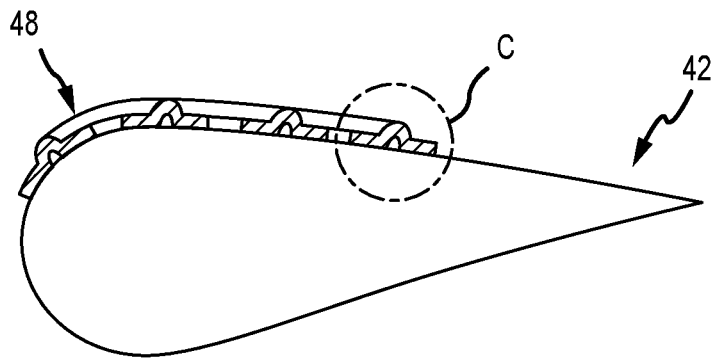
FIG. 6A is a cross-section view of the propeller assembly shown in FIG. 5A taken about line B-B.
Figure 6B:
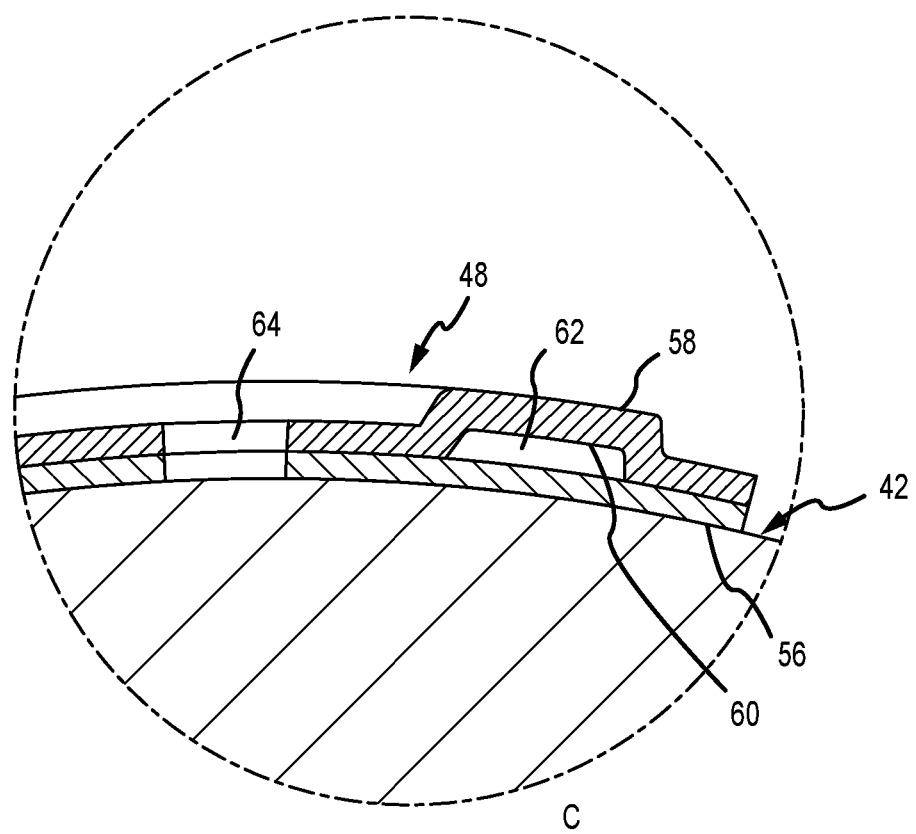
FIG. 6B is an enlarged detail view of the radiator construction as shown in region C of FIG. 6A.

With reference to FIGS. 6A and 6B, the radiator 48 can include a first arcuate panel 56 shaped to conform to the leading edge 50 of the blade 42 and a second arcuate panel 58 mated with the first arcuate panel 56. As depicted in FIG. 6B, the second arcuate panels 58 includes a serpentine channel 60 formed thereon to form a serpentine fluid passage 62 between the first and second arcuate panels 56 and 58, respectively. In some embodiments, the radiator 48 further includes thermal breaks 64 formed between portions of the serpentine fluid passage 62. In some embodiments, the first and second panels can comprise sheet metal, such as aluminum sheet that is e.g., laser welded together.

As shown in FIG. 6A, the radiator 48 can cover a portion of the leading edge and a portion of the front side of the blade 42. As a result, the radiator 48 not only provides heat rejection and de-ice capabilities, but can also take the place of an anti-erosion strip, which is commonly found on composite blades.

Figure 7A:
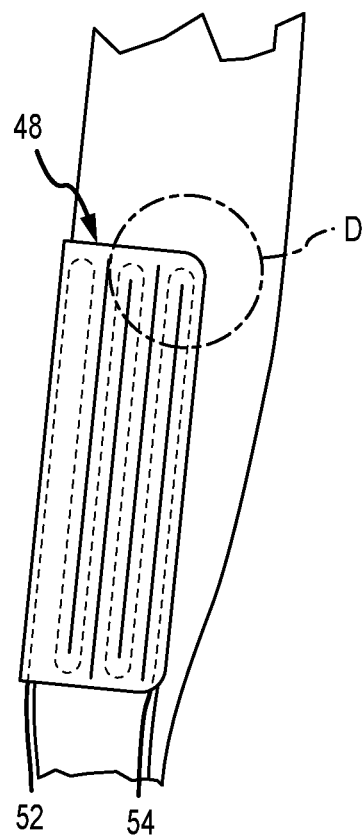
FIG. 7A is a partial front view of the propeller assembly schematically illustrating the serpentine flow path of the radiator according to some embodiments of the disclosed technology.
Figure 7B:
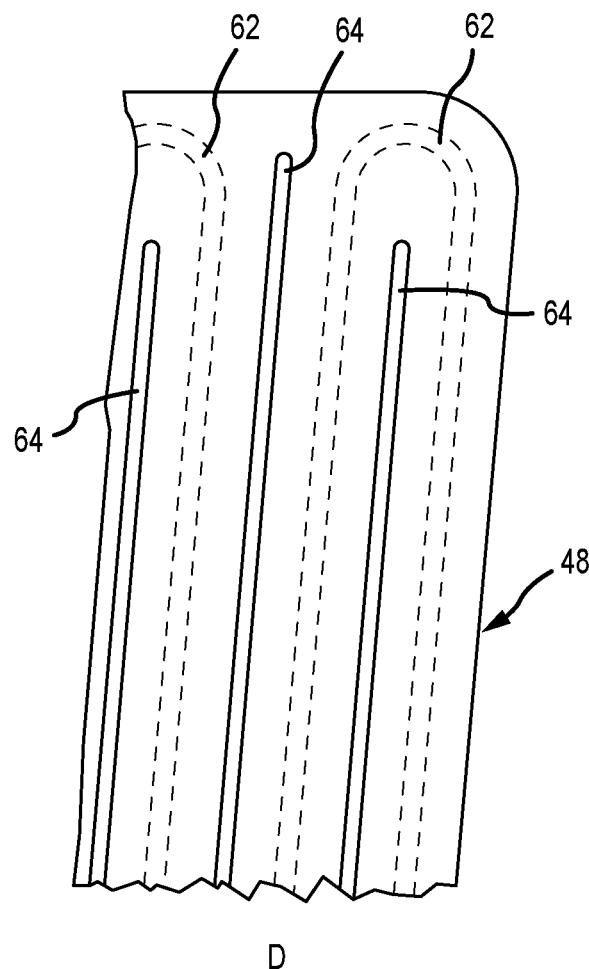
FIG. 7B is an enlarged detail view of the radiator construction as shown in region D of FIG. 7A.

FIGS. 7A and 7B further illustrate the serpentine fluid passages 62 with thermal breaks 64 positioned between them. In some embodiments, the thermal breaks 64 can be in the form of slots machined through the radiator panels.

Figure 8A:
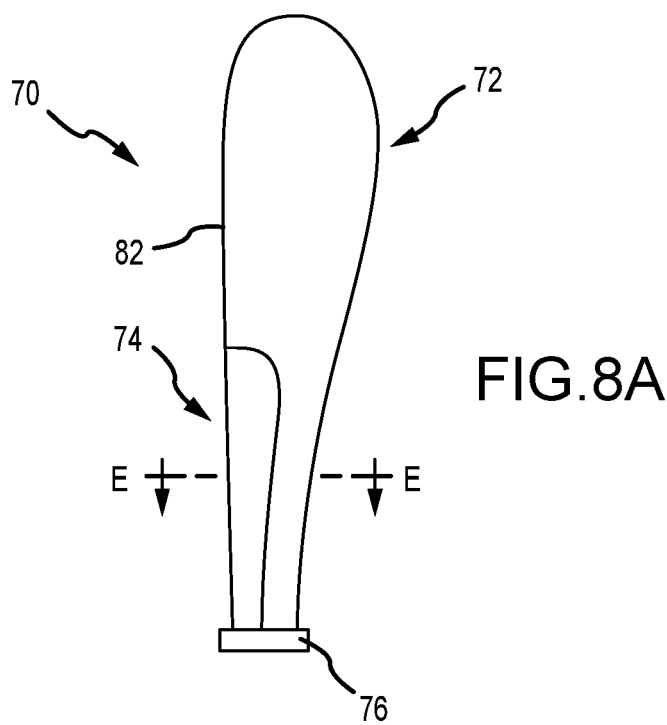
FIG. 8A is a front view of a propeller assembly having a leading edge radiator according to some embodiments of the disclosed technology.
Figure 8B:
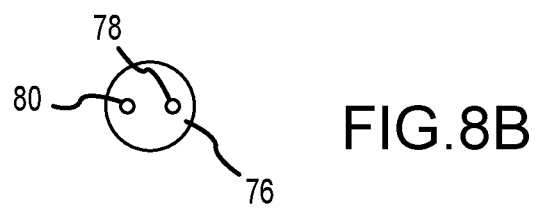
FIG. 8B is an end view of the propeller assembly shown in FIG. 8A.
Figure 8C:
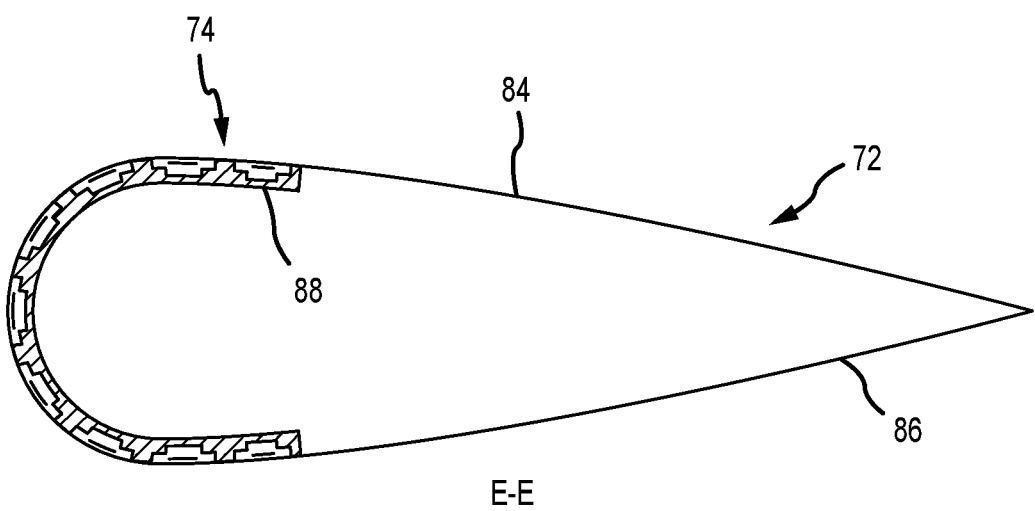
FIG. 8C is a cross-section view of the propeller assembly shown in FIG. 8A taken about line E-E.

FIGS. 8A-8C illustrate an aircraft propeller blade assembly 70 according to some embodiments of the disclosed technology. Blade assembly 70 includes a radiator 74 that can wrap around the front of the blade 72 in the form of e.g., a conformal cuff. In other words, the radiator 74 covers at least a portion of both a front side 84 and a back side 86 of the blade 72 adjacent the leading edge 82. As shown in FIG. 8B, the inlet connection 78 and outlet connection 80 can extend radially through the blade root 76.

With reference to FIG. 8C, the radiator 74 can be flush mounted to the blade 72. The radiator 74 is positioned in a recessed region 88 such that the radiator is flush with the front and back sides of the blade. The radiator 74 can be attached to the blade with adhesive, epoxy, or the like. Suitable fasteners can also be used to attach the radiator to the blade. In some embodiments, the radiator is configured such that the first radiator panel faces the blade (see e.g., FIG. 6B). In the embodiment depicted in FIG. 8C, the radiator is configured such that the second radiator panel (e.g., panel including serpentine channels) faces the blade so that the first panel becomes part of the surface of the blade so that the blade can have the ideal aerodynamic shape with little to no disruption. This arrangement results in more surface area of the radiator being exposed to the environment for heat transfer. It can also provide a more durable surface to act as an anti-erosion strip—e.g., more sheet metal area than epoxy area.

Figure 8D:
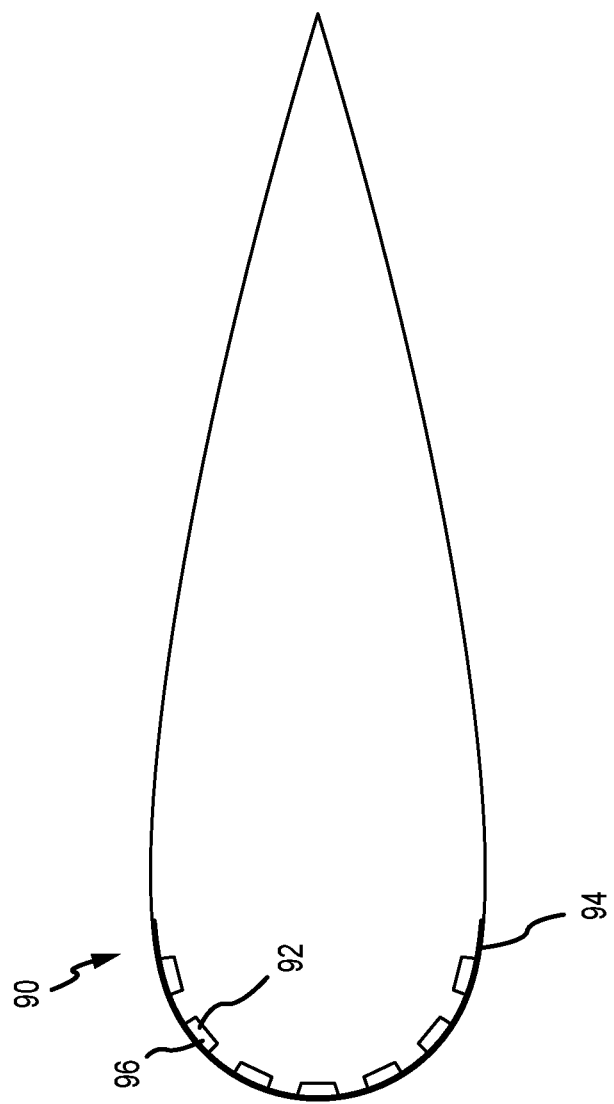
FIG. 8D is cross-section view of a propeller assembly according to some embodiments of the disclosed technology.

FIG. 8D is a cross-sectional view illustrating a blade 90 with fluid channels 92 formed into the surface of the blade 90. A panel 94 is attached to the leading edge of the blade to cover the channels thereby forming the fluid passage(s) 96. In some embodiments, the panel 94 can be attached to the blade with suitable fasteners and/or adhesive. The radiator can thus be integrated into a blade by machining or forming many small straight and/or curved channels that are subsequently covered by the panel. For example, the channels can be machined into an aluminum blade or formed into the surface of a composite blade.

FIGS. 9A-9C illustrate a propeller and hub assembly 100 according to some embodiments of the disclosed technology. The propeller and hub assembly 100 can include a hub 104 carrying multiple radiator blades 102. As shown in FIG. 9B, the hub 104 can include a fluid inlet passage 108 that supplies fluid from a heat source (e.g., ICE or batteries) to each blade 102. The fluid inlet passage 108 connects to an inlet connection 114 extending radially through the blade root 106. The inlet connection 114 is concentric with a radial axis of the blade 102 to facilitate operation of a rotary union. The rotary union allows the blade to rotate with respect to the hub for pitch control. The hub 104 can also comprise a fluid return cavity 112 that is in fluid communication with an outlet connection 116 which also extends radially through the blade root 106 (FIG. 9C). The fluid return cavity 112 can include an outlet 110 that returns cooled fluid to the system.

Figure 10:
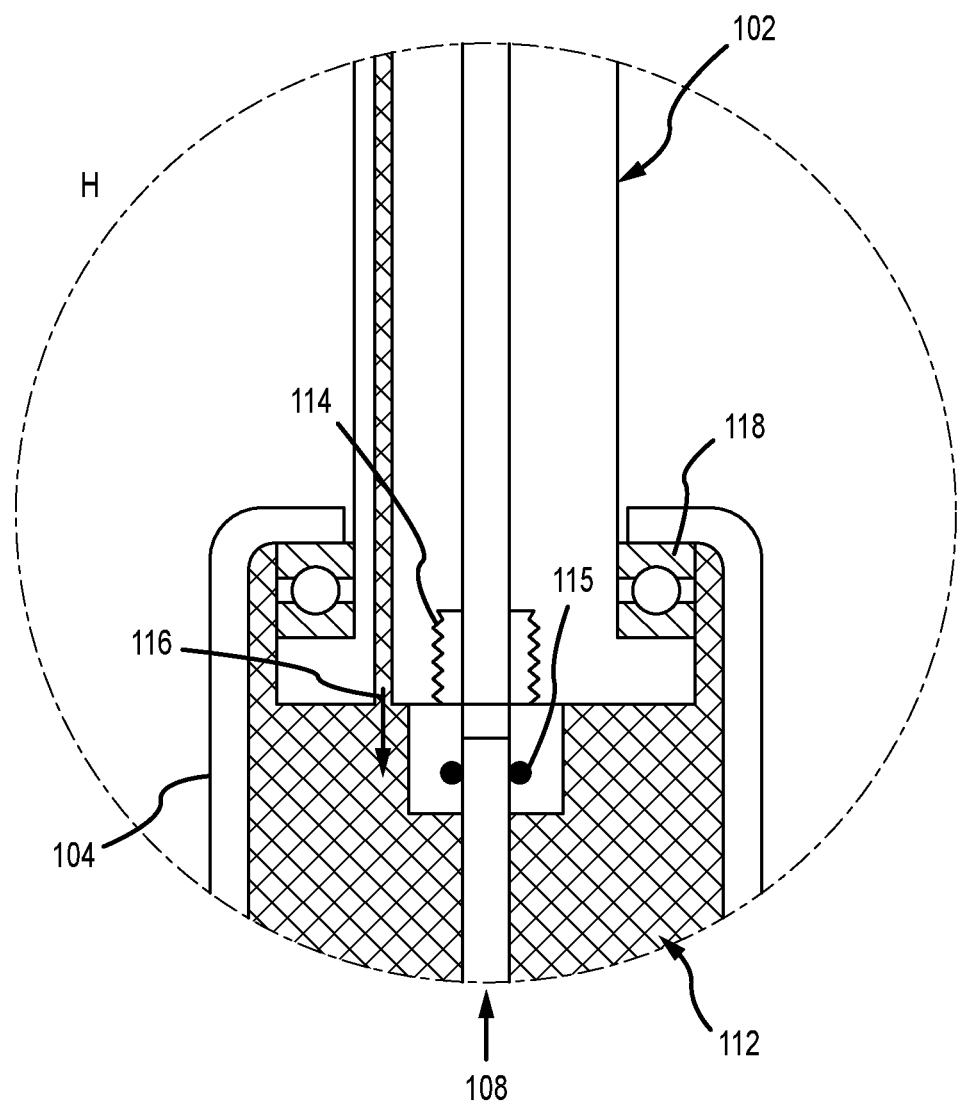
FIG. 10 is an enlarged detail view of the propeller and hub assembly as shown in region H of FIG. 9B.

FIG. 10 is an enlarged detail view of the blade 102 coupled to the hub 104 in the hub assembly 100. As noted above, the inlet connection 114 is concentric with a radial axis of the blade 102 to facilitate operation of a rotary union including seal 115. The blade 102 can be supported in the hub 104 with a bearing/seal 118. The outlet connection 116 from the radiator returns cooled fluid to the return cavity 112 as shown. In some embodiments, the hub 104 and fluid cavity 112 are components of a mechanical pitch governor for controlling the pitch of the propeller blade.

The present disclosed technology provides the advantage of using the propeller blades for cooling of the coolant. As such, a traditional, dedicated radiator for the coolant can be dispensed with. This has the advantage of eliminating the weight and high drag associated with the traditional cooling system that is known to the industry. The aerodynamic drag that results from the traditional cooling system can be 7-10% that of the total aircraft parasitic drag which if eliminated would have significant impacts on the aircraft performance. The resulting increase in aircraft efficiency will have particular benefits on range and endurances which are limited where the prime mover is powered by batteries. Additionally, the cooling provided will be roughly proportional to the speed of the air flowing over the propeller blade resulting in greater heat ejection potential at high rpm and lower air speeds. Instead of shedding the heat from the coolant directly to the atmosphere, the disclosed technology puts the heat to work for anti-icing purposes as discussed above and eliminates the weight, cost, and maintenance of a conventional dedicated anti-ice system.

Another aspect of the disclosed technology is a method of transferring heat from the source of heat 20 to the propeller blade 19. The method includes the steps of (a) heating the coolant with heat from the source of heat to generate the hot coolant; (b) flowing the hot coolant through a coolant passage in the propeller; (c) exchanging heat from the hot coolant to the propeller and from the propeller to the atmosphere around the propeller to transform the hot coolant into reduced temperature coolant; and (d) returning the reduced temperature coolant to the source of heat to be reheated by heat from the source of heat to again generate hot coolant.

Some additional features and functionalities that are part of the disclosed technology or can be incorporated into other embodiments follow. The blades have passages co-cured into blades made of composites. The blades are a combination of materials where the inner ~⅓ of the blades are machined from aluminum and the remaining blade is made from composites. The aluminum section has high thermal conductivity and is easily fabricated with the needed features of coolant passages and the other features needed for a attaching the propeller to the hub (bearing surfaces, drive arms, balances, etc.). The heat is transferred from the motor to the hub via a fluid, such as oil, flowing through the motor shaft and into the propeller blades. The fluid is transferred to the spinning propeller hub via passages that are concentric to the motor axis and contains one or more swivel or rotary unions to allow for fluid flow in/out of the shaft or base of the hub. The fluid flowing through the motor shaft aides in motor rotor cooling. One or more coolant passages is an open connection to a chamber in the propeller hub to allow for fluid flow in/out of the blade. One or more coolant passage is concentric with the pitch rotation axis of the blade and contains one or more swivel or rotary unions to allow for fluid flow in/out of the blade. The heat is transferred into a fluid filled chamber located inside the propeller hub out to the blades. One or more coolant passages is an open connection to a chamber in the propeller hub to allow for fluid flow in/out of the blade. The heat is transferred from the propeller hub to the blades via conduction into the base of the blades via a finned heat exchanger that extends into a fluid filled cavity. The heat is transferred from the propeller hub to the blades via conduction into the base of the blades via heat pipes integrated into the blades that extend into a cavity filled with coolant. The heat is transferred into the hub via a heat pipe and the means of a finned heat exchanger that extend into a fluid filled cavity in the propeller hub. The fluid in the cavity is pumped into the blades via an integral pumping method. The method is a pump integrated into the base of the spinning propeller hub and is powered by a connection to the stationary portion of the aircraft.

The pumping action is provided by inlets that use the propellers spinning motion through the stationary fluid located in a fluid filled cavity in the propeller hub and finned, or other type, features are fixed to the aircraft and extend into the cavity in order to provide mixing and maintain a differential rotational speed needed to provide the fluid flow. The blades are internal as in a jet powered aircraft, for example in an electric/hybrid jet. The system being cooled is an electric motor, electric power inverter, Hydrogen fuel cell, or hybrid power system.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. An aircraft blade assembly, comprising:
a blade extending from a blade root to an opposite tip;
a heat exchanger disposed on at least a portion of a leading edge of the blade, the heat exchanger comprising:
a first arcuate panel shaped to conform to the leading edge of the blade; and
a second arcuate panel mated with the first arcuate panel;
wherein at least one of the first and second arcuate panels includes a channel formed thereon to form a fluid passage between the first and second arcuate panels; and
inlet and outlet connections in fluid communication with the fluid passage and extending radially through the blade root, wherein at least one of the inlet and outlet connections is concentric with a pitch rotation axis of the blade.

2. The aircraft blade assembly of claim 1, wherein the channel is a serpentine channel and the fluid passage is a serpentine fluid passage.

3. The aircraft blade assembly of claim 1, wherein the blade includes a recessed region and the heat exchanger is positioned in the recess.

4. The aircraft blade assembly of claim 3, wherein the heat exchanger is attached to the recessed region with adhesive.

5. The aircraft blade assembly of claim 1, wherein the first and second arcuate panels comprise sheet metal.

6. The aircraft blade assembly of claim 5, wherein the first and second arcuate panels are welded together to form the fluid passage.

7. The aircraft blade assembly of claim 1, wherein the heat exchanger further comprises thermal breaks formed between portions of the fluid passage.

8. The aircraft blade assembly of claim 1, wherein the heat exchanger covers at least a portion of both a front and a back side of the blade adjacent the leading edge.

9. An aircraft blade assembly, comprising:
a hub including a fluid return cavity;
a blade extending from a blade root to an opposite tip, wherein the blade root is coupled to the hub; and
a heat exchanger disposed on at least a portion of a leading edge of the blade, the heat exchanger comprising:
a first arcuate panel shaped to conform to the leading edge of the blade;
a second arcuate panel mated with the first arcuate panel, wherein at least one of the first and second arcuate panels includes a channel formed thereon to form a fluid passage between the first and second arcuate panels;
a first connection in fluid communication with the fluid passage; and
a second connection in fluid communication with the fluid passage and the fluid return cavity.

10. The aircraft blade assembly of claim 9, wherein the first and second connections extend radially through the blade root.

11. The aircraft blade assembly of claim 9, wherein the blade includes a recessed region and the heat exchanger is positioned in the recess.

12. The aircraft blade assembly of claim 11, wherein the heat exchanger is attached to the recessed region with adhesive.

13. The aircraft blade assembly of claim 9, wherein the first and second arcuate panels comprise sheet metal.

14. The aircraft blade assembly of claim 13, wherein the first and second arcuate panels are welded together to form the fluid passage.

15. The aircraft blade assembly of claim 9, wherein the heat exchanger further comprises thermal breaks formed between portions of the fluid passage.

16. The aircraft blade assembly of claim 9, wherein the heat exchanger covers at least a portion of both a front and a back side of the blade adjacent the leading edge.

17. The aircraft blade assembly of claim 9, wherein the hub and fluid cavity are components of a hydro-mechanical pitch governor for controlling a pitch of the blade.

18. An aircraft blade assembly, comprising:
- a blade extending from a blade root to an opposite tip;
- a heat exchanger disposed on at least a portion of a leading edge of the blade, the heat exchanger comprising:
    - a channel formed into a surface of the blade; and
    - an arcuate panel shaped to conform to the leading edge of the blade and cover the channel to form a fluid passage between the blade and the panel; and
- inlet and outlet connections in fluid communication with the fluid passage and extending radially through the blade root, wherein at least one of the inlet and outlet connections is concentric with a pitch rotation axis of the blade.

* * * * *